United States Patent [19]

Osborne et al.

[11] Patent Number: 4,665,436
[45] Date of Patent: May 12, 1987

[54] NARROW BANDWIDTH SIGNAL TRANSMISSION

[76] Inventors: Joseph A. Osborne, 350 SE. 13th Ave., Pompano Beach, Fla. 33060; Cindy Seiffert, 6055 Town Colony Dr. #1215, Boca Raton, Fla. 33433

[21] Appl. No.: 811,176

[22] Filed: Dec. 20, 1985

[51] Int. Cl.⁴ ............................................. H04N 7/12
[52] U.S. Cl. .................................. 358/136; 358/133; 358/135; 375/27
[58] Field of Search ...................... 358/133, 135, 136; 375/27

[56] References Cited

U.S. PATENT DOCUMENTS

| | | | |
|---|---|---|---|
| 2,905,756 | 9/1959 | Graham | 358/135 |
| 4,193,092 | 3/1980 | Stoffel | 358/136 |
| 4,200,886 | 4/1980 | Musmann et al. | 358/135 |
| 4,292,651 | 9/1981 | Kretz et al. | 358/135 |
| 4,402,010 | 8/1983 | Vogelman | 358/133 |
| 4,411,001 | 10/1983 | Van Buul et al. | 375/30 |
| 4,468,708 | 8/1984 | Coleman, Jr. | 358/310 |
| 4,477,915 | 10/1984 | Peters | 375/30 |
| 4,488,175 | 12/1984 | Netravali | 375/27 |
| 4,517,596 | 5/1985 | Suzuki | 358/133 |
| 4,546,383 | 10/1985 | Abramatic et al. | 358/135 |
| 4,569,058 | 2/1986 | Grallert | 358/133 |

Primary Examiner—Howard W. Britton
Assistant Examiner—John K. Peng
Attorney, Agent, or Firm—Steele, Gould & Fried

[57] ABSTRACT

A method and apparatus for compressing digital data for transmission and reception in a narrow bandwidth, the method comprising preliminarily smoothing raw data according to a spatial convolution or running average technique, sampling the convoluted or averaged data to produce a subset having information from the full set of raw data, but fewer data points, determining the energy of the subset with a transform coder, encoding the transformed image, predicting the full set of raw data points at and between the points in the subset by means of a prediction algorithm, subtracting the raw data from the thus-predicted values to develop a difference signal, encoding one field of the difference signal and transmitting the encoded transformed data and the encoded difference signal to a receiver employing the same prediction algorithm. The signal is decoded in the receiver to produce both the transformed image and the difference signal. The decoded transformed image is applied to the predictor, and then subsampled and added to the decoded difference signal, thereby recovering the raw data. Statistical techniques are used in encoding to assign the shortest of variable length data words to the most frequent occurrences of given data values. The preliminary convolution or averaging reduces the extent of standard deviation of data values. The apparatus includes video processing hardware adapted to the method, and may include parallel processing for producing the convoluted average, subtraction, encoding, decoding or addition.

9 Claims, 12 Drawing Figures

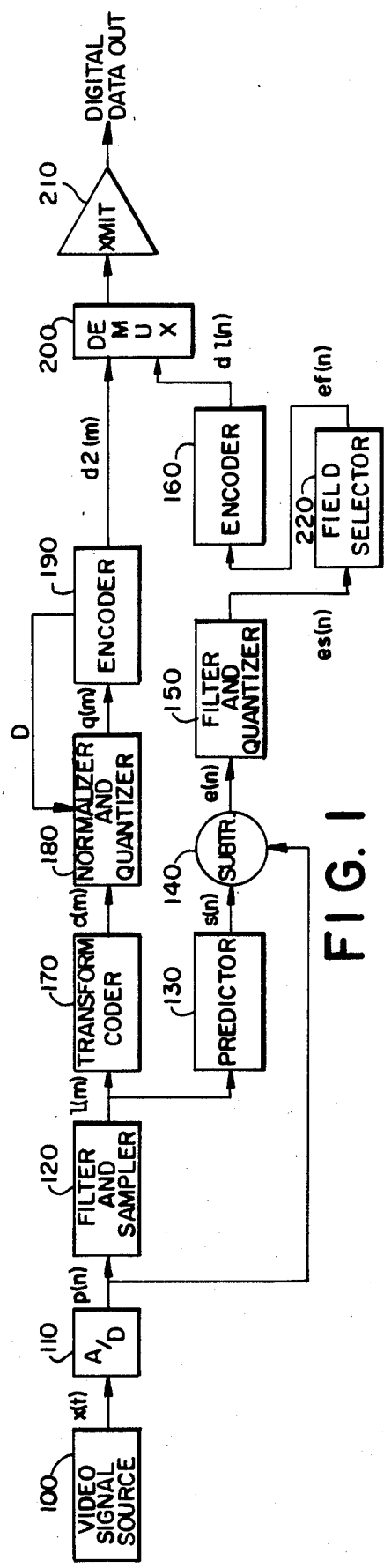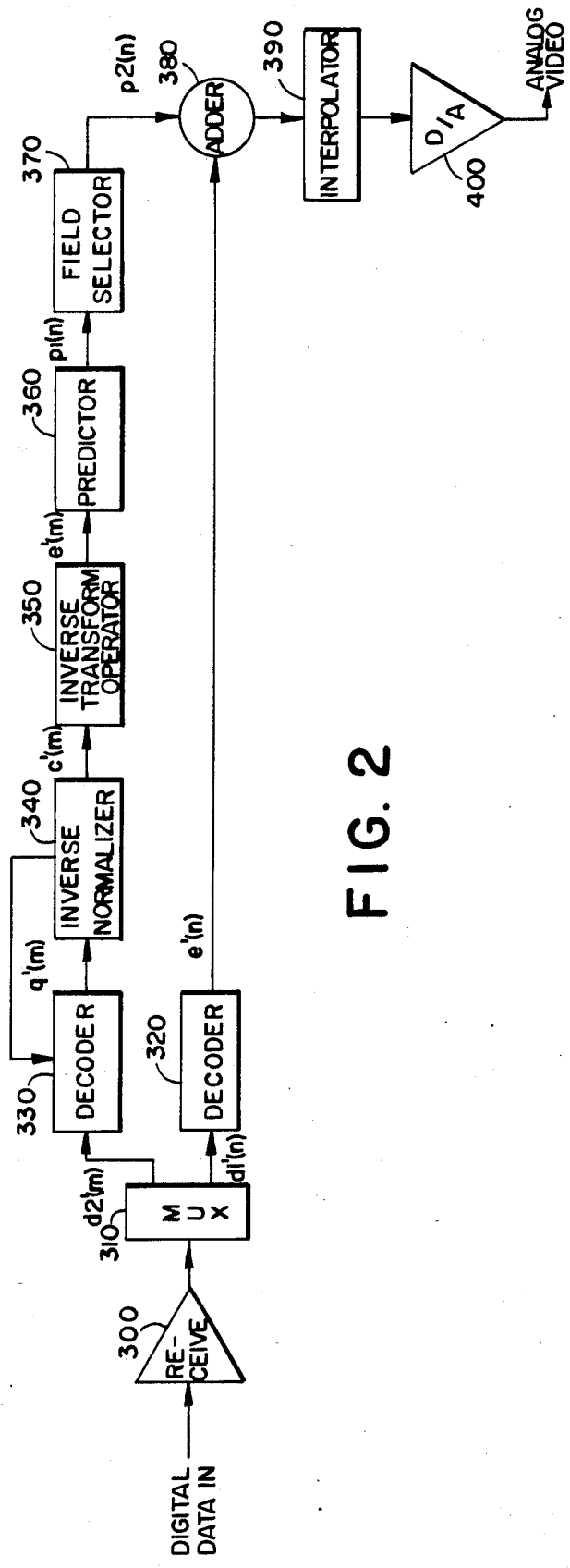

NARROW BANDWIDTH SIGNAL TRANSMISSION

BACKGROUND OF THE INVENTION

1. Field of the Invention

This invention relates to the field of digital data transmission, and especially to video data transmission in which bandwidth requirements are reduced by reducing the number of bits used to encode the signal, while retaining accuracy and resolution of the digital data.

2. Prior Art

Various techniques are known for digitizing data and using predictor circuits to avoid the necessity of transmitting data bits if the same information can be transmitted using some other technique. Typically, some spatial or temporal pattern or redundancy is detected in the data and encoded for transmission in lieu of the data itself. An example of such a system is disclosed in U.S. Pat. No. 4,402,010 to Vogelman. A system of run length coding for video transmission is provided with means to determine when a scan line in a digitized video signal is equal to a previously-transmitted line, in which event the line is not re-transmitted. Instead, a sync signal is transmitted to advance the line count, the receiver merely repeating the already-received line data. Similarly, when successive digitized samples of a frame have equal intensity or the like, a unique code is transmitted to so indicate.

According to the Vogelman technique, bits which are redundant in successive pixels or successive lines are not transmitted, and instead a lesser number of bits are sent to indicate the redundancy. Theoretically, the Vogelman system will result in a substantial savings in the number of bits to be transmitted, and a consequent reduction in the bandwidth required to transmit the data within a given time, e.g., the video frame scanning period. The decrease in the amount of data to be transmitted as a result of such compression is most remarkable in connection with transmission, for example, of facsimiles and the like, in which there is usually a large portion in the frame to be transmitted that is of substantially-equal intensity. Such unoccupied areas are likely to be a large part of documents containing text, wherein line spacings and margins are blank.

In connection with video image transmission other than facsimile transmission, Vogelman's technique of detecting redundancy in successive portions of the data is less effective. In the case of teleconferencing and general video transmission such as for entertainment, security, etc., the subjects shown in the video image are likely to be characterized by more complicated variation in color and intensity than is characteristic of facsimile transmission. Backgrounds are likely to be unevenly lighted, textured, or otherwise characterized by subtle gradations in chrominance (color) and/or luminance (intensity). If the video signal is to be encoded and transmitted at video scanning speed with good resolution and tight bandwidth, then it is not sufficient to merely detect redundancy and indicate that a portion of data should be a repeated from a previously-transmitted portion. Too little of the data is actually redundant from pixel to pixel and line to line.

Systems are possible along the lines of Vogelman's system where temporal redundancy between successive frames is used for data compression. Unfortunately, whether the comparison is pixel and pixel, line to line or frame to frame, the variation in data values for general purpose video is such that for practical purposes the actual realized compression is minimal and may at times even be negative.

A system is also known and used in Japan, known as the MUSE system, in which a reduced sampling rate is used to reduce bandwidth requirements. In this system, a sampling technique is undertaken with each successive displayed video frame comprising three-fourths pixels repeated from the previous frame and one-fourth newly-transmitted data. The sampling pattern changes from frame to frame, until after four frames the pixels are all brought up to date. Sampling according to such a system is characterized by a substantial savings in bandwidth because only a portion of the total frame to be displayed is transmitted at any time. The system has difficulties with motion. When used for teleconferencing video, the MUSE system is adequate for viewing still items, but when a subject moves in the field or if the video camera is to be panned, the subject is blurred or may even disappear until coming again to a stable position.

There are known systems in which only a sample of data points for the frame is transmitted as in the MUSE and an attempt is also made to predict the values of other data points based upon the values of the sampled points. Reference can be made, for example, to U.S. Pat. Nos. 4,193,092 to Stoffel and 2,905,756 to Graham, which predict interleaved pixel values by interpolating from other pixel values. The Graham patent teaches choosing among alternative predictors by subtracting the predicted values from the actual values, to develop a prediction error signal, which can be compared against other predictors. Examples of other techniques with one or more predictors may be found in U.S. Pat. Nos. 4,477,915 to Peters, 4,411,001 to Van Buul et al, 4,200,886 to Musman et al and 4,292,651 to Kretz et al.

The bandwidth of a transmitted signal, whether it be a television video signal or a facsimile signal, is related to the amount of information to be transferred and the transmission time, normally the scanning rate. In television transmission, the scanning rate is uniform, and the bandwidth required for the system is that needed to transmit a signal characterized by the fastest possible rate of change in intensity while retaining satisfactory picture quality. Since the bandwidth is dictated by the worst case greatest rate of change, the bandwidth devoted to the channel is wasted during transmission of any smaller rate of change.

The system can also be considered based upon the amount of digital data required to encode data to the required resolution. Typically, the changes in intensity from one point to the next in a video signal will be minimal. Nevertheless, in order to retain the possibility of transmitting and receiving the minimum and maximum intensities in immediately-adjacent digitized picture elements, it becomes necessary to encode the intensity to any point within the overall range. Unless a full scale change in intensity is experienced, the span or resolution to which the intensity may be encoded is wasted.

The present invention provides a way in which the rate of change from pixel to pixel in a sampled video signal is reduced from actual conditions by means of a localized averaging. Instead of predicting and/or encoding the differences between pixels according to temporal or spatial redundancy, the invention encodes differences from the averaged artifically-smoothed succession of pixels. This smoothed video signal is employed in addition to a transformed signal of the original image. The transformed signal represents the energy of the pixels in ane picture frame. Both the difference data as well as the transformed energy data are encoded using techniques to minimize word length, to realize a system characterized by full resolution and accuracy but a minimum of bandwidth. The system of the invention makes maximum use of the allotted bandwidth, with little or not deterioration in the transmission quality. The raw signal in its input form is substantially-completely recovered in the output at the receiver.

SUMMARY OF THE INVENTION

It is an object of the invention to optimize the efficiency of digital data communications by reducing the number of bits to be transmitted and reducing the required transmission bandwidth, without deterioration in transmission quality.

It is also an object of the invention to facilitate video transmission in digital format, thereby allowing re-amplification, re-processing, security coding and other processes, without loss in signal-to-noise ratio.

It is a further object of the invention to provide a method and apparatus for encoding and decoding a digital signal which varies transmission duration and bit length for individual scan lines and individual frames.

It is a further object of the invention to take advantage of statistical characteristics of a digital signal, whereby at a given transmission bandwidth, when the rate of data change is low, fewer bits are transmitted and when the rate of change is faster, the number of bits, and hence the transmission duration, is longer.

It is still another object of the invention to provide a digital signal processing system in which any conventional television receiver, not equipped with a similar decoding predictors, will be unable to directly decode the transmission.

It is still another object of the invention to provide a digital transmission system that is conveniently subject to security coding by binary substitution coding, which coding can be changed as frequently as required.

It is a further object of the invention to facilitate a move up to higher definition television transmission, while still using hardware systems originally designed to accomodate transmission of a lower bandwidth requirement.

These and other objects are accomplished by a method and apparatus for compressing digital data for transmission and reception at a tight bandwidth, the method including preliminarily smoothing raw data according to a spatial convolution or running average technique, sampling the convoluted or averaged data to produce a subset having information from the full set of raw data, but fewer data points, computing the energy of the subset by means of a transform coder, encoding the tranformed image, predicting the full set of raw data points at and between the points in the subset by means of a prediction algorithm, subtracting the raw data from the thus-predicted values to develop a difference signal, encoding one field of the difference signal, and finally, transmitting the encoded transformed data and encoded difference signal to a receiver employing the same prediction algorithm. The decoded transformed image is applied to the predictor and then subsampled and added to the decoded difference signal, thereby, recovering the raw data. Statistical means are used in encoding to assign the shortest of variable length data words to the most frequent occurrences of given data values. The preliminary convolution or averaging reduces the extent of standard deviation of data values. The apparatus includes video processing hardware adapted to the method, and may include parallel processing for producing the convoluted average, subtraction, encoding, decoding or addition.

BRIEF DESCRIPTION OF THE DRAWINGS

There are shown in the drawings the embodiments which are presently preferred. It should be understood, however, that the invention is not limited to the precise arrangements and instrumentalities shown in the drawings, nor in all cases to the precise combinations in which the respective elements of the invention are depicted.

FIG. 1 is a block diagram illustrating a transmitter according to the invention.

FIG. 2 is a block diagram illustrating a receiver according to the invention.

DETAILED DESCRIPTION OF THE PREFERRED EMBODIMENTS

Figure 3:
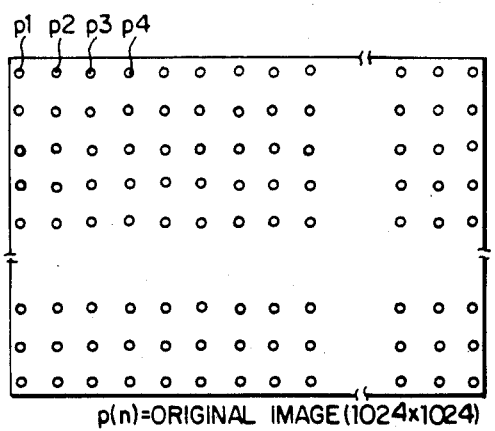
FIG. 3 is a partial functional schematic representation of a plurality of pixels in a high definition video frame or other data set words to be transmitted.

The present invention is applicable to transmission of data in various forms. The invention is especially applicable to video transmissions, and facilitates use of communication equipment presently in use for lower definition video as a means capable of processing video data and the like having a substantially greater definition.

For standard American television transmission as currently in general use, the intensity (luminance) video information occupies four megahertz of each six megahertz channel. The remainder of the channel is devoted to the lower vesitgial side band, the color carrier and the audio transmission. The data transmission method and apparatus described herein is discussed primarily with reference to intensity information as digitally encoded. The same methods and apparatus can be applied to color information transmission since both are fundamentally the result of the same scanning and digitizing process in which characteristics of the displayed frame at each point are digitally encoded to one of a plurality of discrete levels in a range.

In a scanning system for video transmission in which the lines are scanned (and displayed) at a uniform rate, the complexity of the picture being transmitted has no effect on the bandwidth, which is dictated by the "worse case" rate of change. Therefore, a first picture that varies continuously between maximum black and maximum white at a maximum four megahertz rate, and a second picture having a single change from black to white in the entire frame, are transmitted over the same bandwidth and use the same fixed amount of time to scan the frame. Furthermore, synchronizing signals, and signals required to indicate the beginning of a frame, color transmission and the like, occupy another major portion of the bandwidth and about twenty percent of the time required for transmission.

In order to improve the definition (i.e., resolution) of a video transmission, either a greater bandwidth is required to accomodate more data points and/or more discrete levels per point, or a more efficient use of available bandwidth must be made. According to the invention, the transmission time is reduced by not simply transmitting a complete representation of the raw wave form. According to the invention, one transmits an abbreviated transformed image signal, a signal to indicate differences in the data from the defined references, and incidental synchronizing information and the like. The raw signal is reconstituted at the receiving end from the information received.

The invention is discussed in terms of video transmission. Those skilled in the art may appreciate that the invention is applicable to transmission of any type of data which is capable of being characterized as a repetitive frame, cycle or sequence, such as the contents of a memory buffer, a data frame representing some characteristic of a series of items, or the like. FIG. 1 shows a transmission unit according to the invention. Signal source 100, for example the source of data representing a video signal, may be a video camera, a video cassette recorder, or the like. The signal may also, of course, be a signal to be re-transmitted, a signal already stored on any form of mass media, a computer-generated graphics illustration or the like, or a signal from another source.

Using video as a non-limiting example, the original video signal may be in the form of a standard base band analog video signal x(t). This signal is converted to a digital format for processing, by means of analog to digital converter 110, which outputs a digital video signal p(n). It is also, of course, possible that the signal being processed is already digitized at an earlier phase.

Assuming the signal must be digitized, the analog to digital converter is operated by repetitively sampling the instantaneous level of the analog video signal x(t). Sampling occurs at a predetermined repetition rate, which for purposes of discussion can be termed period T. The digital video signal p(n) is a numeric representation of the level when sampled, to be transmitted to a receiver. The sampling rate must be sufficiently high to accomodate the desired resolution. If the video signal p(n) is one frame of a video image, the sampled signal can be considered a succession of dots or picture elements (pixels), as shown in FIG. 3. FIG. 3 indicates a video frame in the form of a matrix of 1125 pixels horizontal resolution by 1125 scan lines, for a total of about 1.3 million pixels in a frame. The frame is scanned and updated in its entirety at a rate that appears continuous in viewing, for example thirty times per second. This scan rate and density of pixels is one possible format for high definition television. Television transmissions are also frequently encoded at lower pixel resolutions, for example a matrix of 512 pixel by 512 pixels. Faster or slower scanning may be desirable for a given application. The invention is not limited to any particular frame format, and can be applied to different numbers of pixels, different horizontal resolutions and different scan lines and scan rates.

According to the invention, the digitized signal p(n) is not simply transmitted in its raw form, nor is it simply transmitted by actually transmitting only difference data from an average or from a previous frame, which would then be used to reconstruct the raw data at the receive end. The invention uses a particular video compression system with the result that the capacity of the transmission means is used optimally. This is done by using a multi-level encoding scheme, including certain characteristics of difference transmission and characteristics of temporal and spatial compression, together with a minimum-bit-count data format.

Figure 4:
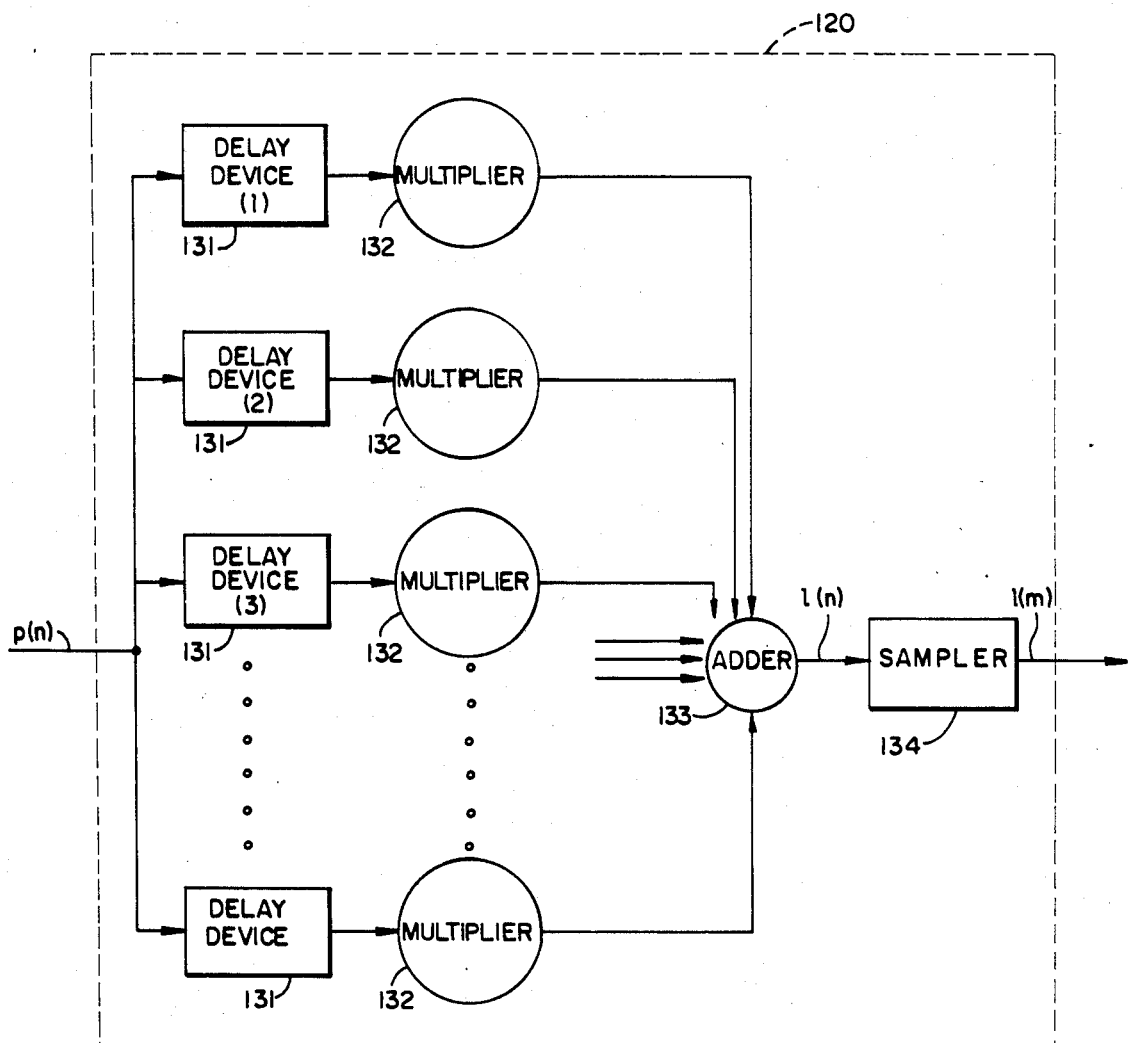
FIG. 4 is a block diagram showing a preferred filter and sampler according to the invention.
Figure 5:
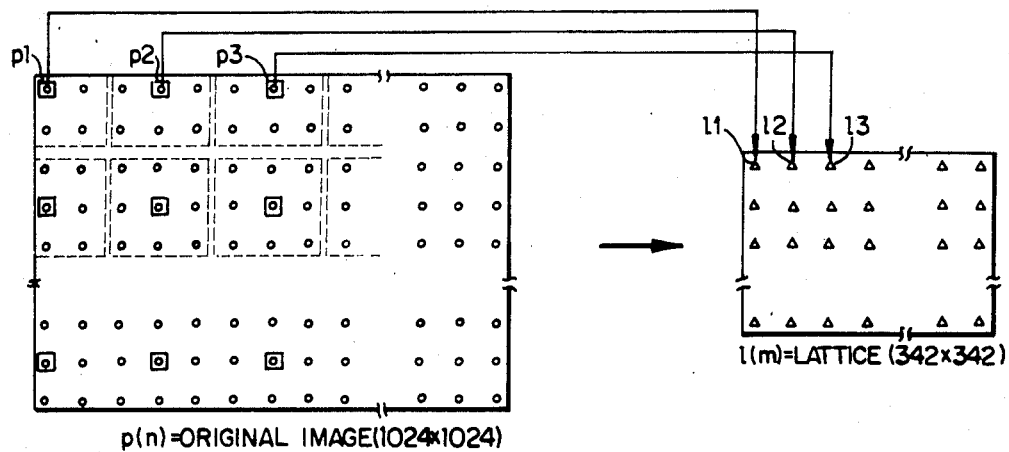
FIG. 5 is a functional illustration of operation of the filter and sampler on particular raw picture elements to produce a filtered and sampled lattice.

Referring to FIGS. 4 and 5, a filter and sampler circuit 120 on the transmission end produces a lattice signal 1(m), which is both a locally-averaged signal and a signal representing a subset of the original data (i.e., fewer points). This signal is to be encoded and transmitted by encoder 150, together with further information.

Figure 6:
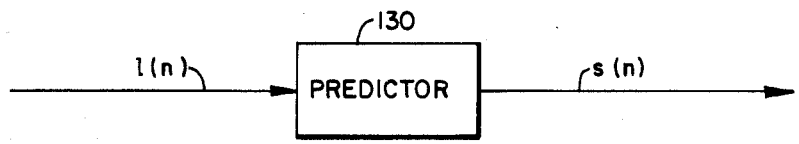
FIG. 6 shows a general purpose predictor, in block form.
Figure 7:
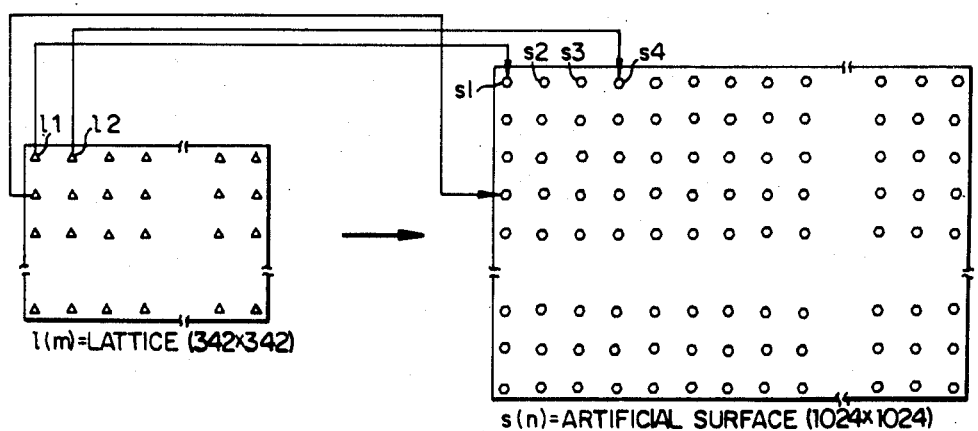
FIG. 7 is a schematic illustration of operation of the predictor to predict and interpolate values for pixels at and between the sampled lattice values.

A predictive signal s(n) is generated by predictor 130 at the transmitter end, which has as its input the lattice signal 1(m) as seen in FIGS. 6 and 7. The predictive signal s(n) is an artificially-generated video signal having the same number of pixels as the original digitized raw image p(n). The predictive signal s(n), however, is generated from the averaged lattice 1(m). Accordingly, the predictor signal s(n) usually varies from the raw data p(n) and if viewed would seem blurred. The predictor 130 in the transmission part of the system is operable in the identical way that a predictor in the receiving system is operable, and accordingly anticipates the product, including errors, which will be produced by the predictor in the receive section when the lattice signal 1(m) is received and processed.

Figure 8:
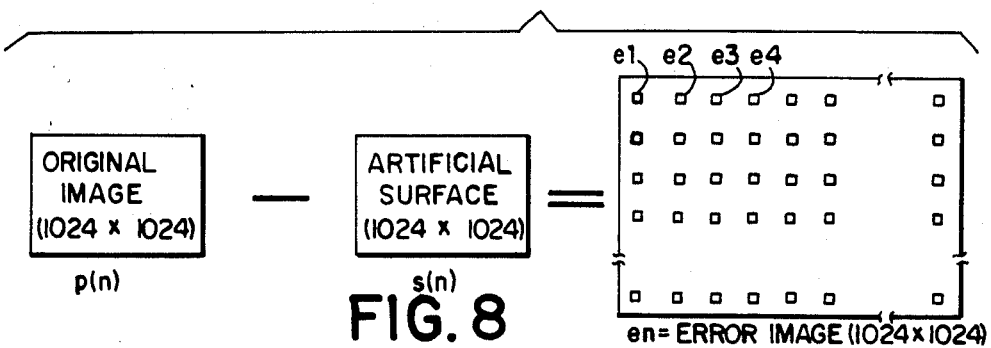
FIG. 8 is a schematic illustration of the subtractor operation for generating an error image.

The predictive signal s(n) is subtracted from original signal p(n) at subtractor 140 in the transmission apparatus, thereby generating a difference or error signal e(n) as seen in FIG. 8. This error signal e(n) is then applied to a filter and quantizr 150; the resulting output being a smoothed error signal es(n) having a smaller range of values than the original error signal e(n). The smoothed error siganl es(n) is encoded by device 160 to produce signal d1(n).

The output of the filter and sampler 120 in addition to being applied to the predictor 130 is also applied to a transform coder 170. The transform coder 170 takes the 1(m) signal and produces a signal c(m) representing the energy of the filtered and sampled original image. This energy is then normalized and quantized by device 180 before being encoded by device 190. The variable length encoder 190 produces signal d2(m) which is a compressed video signal of the original image after having gone through several stages involving filtering, subsampling, and transformations. This siganl d2(m) is time multiplexed out by device 200 along with a previously encoded differnece signal d1(n) and is transmitted via driver 210. The transmission may occur in any specific way, such as over wires, radiated through the air by electromagnetic radiation or light, through an intermediary satellite or the like. It is preferred that the transmission format be one which is in current use.

The invention produces substantial benefits by its comparison of data. Current data transmission formats which will be useful for one or another applications of the invention. In connection with low data rates such as required for video teleconferencing or the like, a T1 format may be employed, which concerns a data rate of approximately 1.5 megabits per second. A T2 format at about 6 megabits per second is appropriate for compressed standard video formats and data rates, i.e., digitized television at currently-conventional resolution at latest 80 megabits per second uncompressed. A T3 format, at about 45 megabits per second, is appropriate for compressed high definition television which would require 350 megabits per second without compression.

The variable length encoder 190 compresses the video signal in a manner that uses shorter digital words for sending data values which occur more frequently, and longer words for the less frequent occurrences, achieving an overall reduction in the number of bits to be transmitted. In a typical video signal, a large proportion of the pixels will have an intensity of one of relatively few frequent values. The number of occurrences in a given narrow range may be increased in a high definition signal, because due to the greater number of pixels, the variation in intensity or color from pixel to pixel can be expected to normally be less. Furthermore, according to the invention, the filter and sampler circuit and the convolution or local averaging technique bases the signal to be transmitted, l(m), on an average that is localized to the area in which the particular pixel is located. Smoothing the difference and average signals causes even more of the data points to fall within narrow bands.

FIG. 2 illustrates the receiver circuitry. The receiver input leads to a multiplexing circuit 310, to which the compressed digitized version of the original image is applied after passing through an interface circuit 300. The interface receiver has any neccesary detection and demodulation circuits to reproduce the transmitted compressed signal. The multiplexing circuit 310 operates exactly opposite of the demultiplexing circuit 200 in the transmitter. It reproduces signals d2'(m) and d1'(n), minus any transmission errors, corresponding to d2(m) and d1(n) in the transmitter. The decoding circuit 320 accordingly reverses the function of the coder 160 in the transmitter yielding the recovered error signal e'(n). Due to the inherent unrecoverable properties of quantizing, the signal e'(n) will not match the original error image signal e(n) in the transmitter but, through experimentation, it has proved to be almost unnoticeably different to the human eye.

The additional circuitry in the receiver is used to invert the process applied in the transmitter to the original signal p(n) through the filter and sampler 120, the transform coder 170, the normalizer and quantizer 180 and finally encoder 190. The decoder 330 exactly inverts the encoding process performed by encoder 190, producing a q'(m) signal. The normalization that was performed by device 1890 is now also reversed by device 340 in the receivers. The energy signal represented by c'(m) must now be transformed back into a signal that will represent the lattice points originally known as l(m) in the transmitter. This function is performed by block 350. Given that a subsampled signal now exists it will be neccesary to enlarge the subsampled signal. Predictor 360 acheives this and produces a signal which the same size dimensions as the original digitized image signal p(n). The field selector 370 strips half of this signal away, namely every other scan line and adds it through adder 380 to the difference image obtained earlier. The signal is then interpolated up to a full size image by interpolator 390 and converted to normal analog means by digital to analog converter 400.

FIG. 4 shows an embodiment of a filter and sampler circuit 120 for producing a localized average and sample signal l(m). This signal is a smaller matrix than the incoming data (i.e., m is less than n), yet the signal has information relating to all the data points in the input signal, by means of the localized convolution or averaging technique. Video signal p(n) is passed through several delay devices 121(x). The output of each delay device is applied to a multiplier 122(x), each of which preferably has a constant factor multiplier. The output of the multipliers 122(x) is added together by summing circuit 123, which yields an average signal l(n), according to the weighting of the multipliers.

Delay devices 121(x) are each arranged with a time delay which will cause the pixels immediately adjacent a given pixel to be applied to the average. There is a delay equal to one sampling period that will apply to a pixel immediately after the subject pixel on the same side, and a delay equal to one scan line to relate to the pixel immediately below, etc. Sampler unit 124 takes an input signal l(n) equal to the weighted average for each successive pixel, and produces an output signal l(m), which is a subset of the original signal l(n) and which includes only spaced lattice points from the original image, for example, one pixel in nine. A counter may be used to ignore a set number, accept one, and so on. The number of pixels selected by sampler 124 is preferably equal to the number of pixels which are to go into the weighted average generated by delay devices 121, multipliers 122 and summing circuit 123. This is not strictly necessary, and the convolution fields could be caused to overlap. Assuming there are nine input pixels to one sampled pixel and there is no overlap to be included, then the time delay TT(n) for the delayed drivers 131(x) may be selected such that:

$$TT(1) = T$$

$$TT(2) = 2T$$

$$TT(3) = 3T$$

$$TT(4) = H + T$$

$$TT(5) = H + 2T$$

$$TT(6) = H + 3T$$

$$TT(7) = 2H + T$$

$$TT(8) = 2H + 2T$$

$$TT(9) = 2H + 3T$$

In this case, T is the time between pixels and H is the time betwen lines. It will be appreciated that use of a delay in order to cause the weighted average to apply in part to a previous pixel causes a certain time shift from the subject pixel to the center of the pattern of nine. It is also possible to cause the sampling to overlap from frame to frame, i.e., to delay by a frame scan less period T to select the pixel before the desired pixel in the next frame. Such a temporal overlap from frame to frame may or may not be acceptable in a given use.

The technique of averaging a group of neighboring pixels is commonly known as a convolution sum. The signal represents a local preferably-weighted average of the original signal p(n). Although nine pixels are disclosed in this example, it is also possible to use a different number of pixels to develop a convolution sum. The delays, etc., as set forth above are simply supplemented as necessary. It is presently preferred that the weighting of pixels in the convolution be a linear function, with greater weight on the center of the convolution box.

The sampler 124 takes the signal l(n) and samples the signal selectively, preferably at the same rate as the number of pixels in the convolution product, and produces a subset of the signal l(n) for the output. FIG. 5 illustrates the effect of the sampling on video image p(n), producing a resulting locally-averaged and sampled signal l(n). Assuming the use of a non-overlapping three by three convolution, one pixel or occurrence in the l(n) signal occurs for every nine occurrences in p(n). The sampler then selectively has chosen l(m) to correspond to the center of a three by three box of p(n) pixels. It is also possible to use a different number of pixels in a convolution product, with results which may or may not be symmetrical as with a three by three product. In any event, the filter and sampler circuit takes the original input image p(n) with all its occurrences, and generates a matrix, for example, of one ninth the number of points. Nevertheless, the subset matrix l(m) is calculated from all the incoming picture elements p(n). Therefore, l(m) has at least some information as to all the information in p(n). As will be seen, this reduces the standard deviation of points to be transmitted and results in savings in the number of bits to be sent.

Subset image l(m) is applied to a predictor. Various predictors are known, and some are disclosed in the references mentioned above in the discussion of prior art, which are hereby incorporated in this disclosure by reference.

Generally speaking, a predictor 130 according to the invention may be as simple as a means for repeating the convolution average for all points in a box, averaging interpolated pixels between the sampled pixels in l(m), or the predictor may have other and more complex characteristics. It is preferred that the predictor effect a smooth transition from neighboring points in l(m), with reference to the weighting of the average used to develop l(m). Appropriate predictors may also base the predicted signal s(n) on various indicia in addition to the content of signal l(m). For example, predictors may be adapted to anticipate that the value of a pixel will be similar to a previous value of the same pixel, similar to the value of other pixels in the area or the like. More complicated predictors may be sensitive to successive video frames and detect the movement of patterns therein. For example, a moving edge of contrasting luminance and chrominance may be expected to continue to progress from pixel to pixel and a predictor can be adapted to anticipate such changes. The predictor applies a predetermined algorithm to develop an artificial predicted frame s(n) having a number of pixels equal to the number of pixels in the original frame p(n).

The predicted or artificial frame s(n) is compared to the raw original image p(n), and a difference or error signal e(n) is developed to be transmitted as well. FIG. 8 shows the subtraction. The error signal e(n), of course, an image signal of itself, having as many pixels as the raw data signal p(n) and the artificial frame signal s(n). If the predicted image s(n) happens to be exactly equal to the original signal p(n), then the error image is blank. Predictor circuits are not so accurate that they can precisely match the input, but strive by various means to keep the error image near zero (i.e., near blank). The better the predictor surface, the more occurrences of the error signal of zero or blank. Furthermore, if a large number of blanks can be generated, then transmission of the error signal using a variable length word technique in which shorter code words represent the most frequent data occurrences, is extremely efficient.

Figure 10:
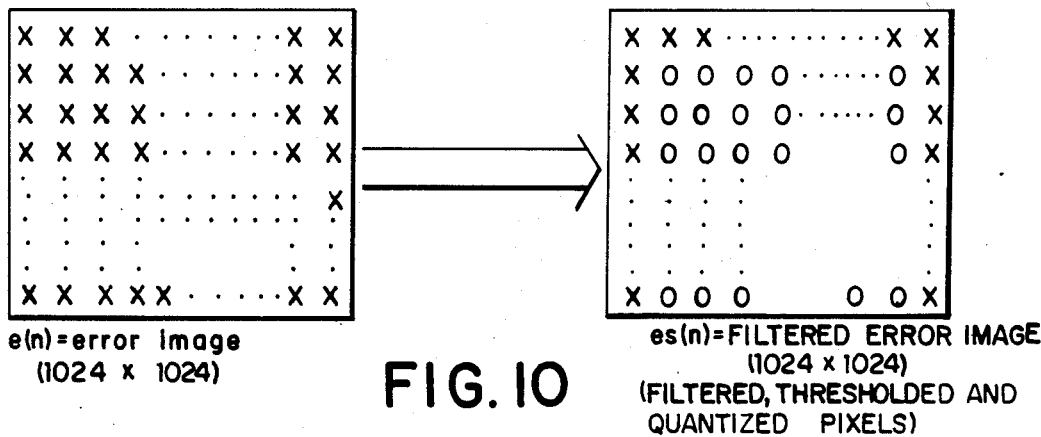
FIG. 10 is a schematic illustration of the error image before and after filtering and quantizing.
Figure 11:
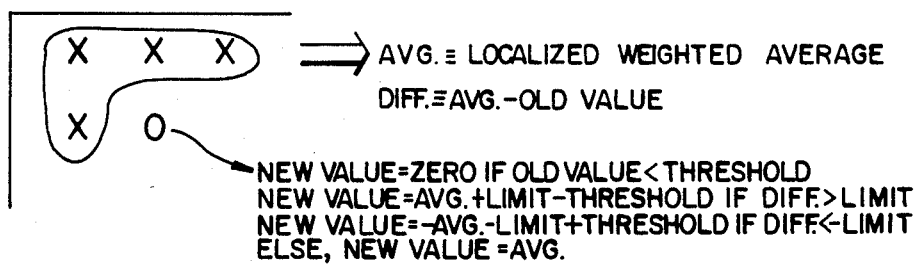
FIG. 11 is a schematic illustration of a suitable local averaging technique.

The process of filtering and quantizing performed by device 150 is illustrated in FIG. 10. The first line of the error signal is stripped out of the filter and quantizer as is, as well as all the border points of the image e(n). The intermediate points are filtered, thresholded and quantized as depicted in FIG. 11. This filtering and quantizing reduces the bandwidth of the signal, yielding less data to be transmitted. The filtering is a local weighted average based on surrounding pixels and the quantized. The quantization chosen here is one where, if the error signal e(n) is less than a certain threshold value, the new value assigned will be zero; if it is larger than a certain value, say 127, then it is assigned a value equal to 127 and the total weighted average computed; else the value assigned is the local weighted average.

Field selector 220 just strips every other scan line to yield one field of the image.

Besides the process of developing an error signal e(n), the transmitter simultaneously performs another process to transform the filtered and subsampled signal l(m). Device 170, a transform coder, has prover to be an effeicient means of image coding. In the basic transform image coding concept, an image is divided into small blocks of pixels, and each block undergoes a 2-dimensional transformation to produce an equal-sized array of transform coeffeicients. Among various transforms investigated for image coding applications, the cosine transform has energed as the best candidate from the standpoints of compression factor and ease of implementation. The array of transform coefficients is quantized 180 and coded using a zonal coding strategy: the lowest spatial frequency coefficients, which generally possess the greatest energy, are quantized most finely, and the highest spatial frequency coefficients are quantized coarsely. The 2-dimensional discrete cosine transform implemented in device 170 can be defined as follows:

$$C(u,v) = \frac{4F(u)F(v)}{v^2} \sum_{j=0}^{N-1} \sum_{k=0}^{N-1} l(j,k) \cos\frac{(2j+1)u\pi}{2N} \cos\frac{(2k+1)v\pi}{2N}$$

for u,v = 0,1, ... N=1 where $$F(w) = 1/\sqrt{2} \text{ for } w = 0$$
$$\quad\quad\quad 1 \quad\text{ for } w = 1,2, \ldots N-1;$$

N is defined as the block coding size.

The equation above refers to the filtered signal l(m) as being 2- diminesional as indeed the signal is; but the signal will be described throughout this description merely as l(m). The same dimensionality is true for c(m).

The quantization process in 180 can be preceeded by a threshold process in which all the coefficients that are below the threshold are set to zero and those coefficients above the threshold are substracted by the threshold. The quantization process is then a simple floating point to integer roundoff conversion. Because many of the threshold substracted coefficients are of fractional value, the roundoff process will set some of the coefficients to zero and leave only a limited number of significant coefficients to be coded. Normalization occurs as a result of a feedback path from the encoder 190 to the quantizer 180. The scaling process adjusts the range of the coefficients such that a desired number of code bits can be used during the coding process.

Figure 9A:
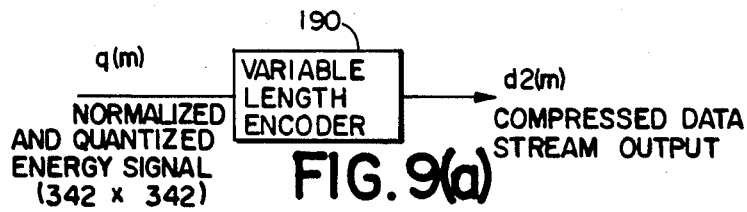
FIGS. 9(a) and 9(b) are block diagrams showing the variable length encoder operation.
Figure 9B:
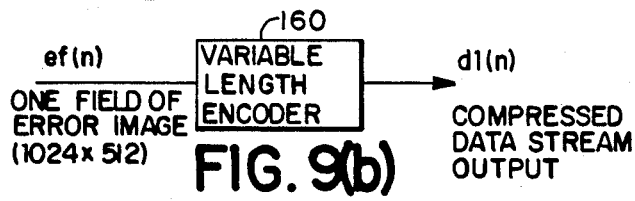

The encoding process is shown in FIG. 9. Encoder 160 and 190 can be identical but this is not neccesary. Maintaining a constant rate output by providing feedback signal D in device 190 is used in the encoder 190, but not in 160. Encoder 190 assigns a variable length code to its inputs to yield compressed video data output d2(m). Encoder 160 is described here to be similar to encoder 190 but it will be appreciated that various other encoding schemes can be used. The objective is to reduce the number of transmitted bits as much as possible, for example, by statistical examination of the data. Codes are assigned based upon the frequency of occurrence of the input values. The frequency of occurrence of various values for video scenes can be estimated and preassigned. TABLE I illustrates this usage for HUFFMAN codes, and also includes an indication for certain special codes such as frame sync and the like. Various other codes besides Huffman codes are possible. Huffman codes are discussed herein for purposes of illustration.

TABLE I

|  | encoded output d(n) |
|---|---|
| ef(n) | |
| most frequent value | 00 |
| . | 110 |
| . | 101 |
| . | 011 |
| least frequent value | 11110100 |
| q(m) | |
| most frequent value | 00 |
| . | 110 |
| . | 101 |
| . | 011 |
| least frequent value | 11110100 |
| special | |
| frame sync | special code 1 |
| line sync | special code 2 |
| q(m) sync | special code 3 |
| ef(n) sync | special code 4 |

Additional variations on the basic invention are also possible. Security encoding of the transmissions to eliminate the possibility of pirating of transmissions can be conveniently accomplished according to the invention. There is no particular requirement that the incoming video signal p(n) be actually capable of direct viewing as is. Instead, a binary substitution code can be applied to the incoming data to make it unintelligible unless decoded. The binary key which is used to encode the data for security purposes can be changed as frequently as desired, even within a given frame. This will not unduly detract from the efficiency of compression according to the invention, because the localized averaging and error transmission techniques will still recover the original data completely, and the compression system by virtue of its localized averaging will compress even security-encoded data.

An additional coding variation which may be considered is use of continuously-varying variable word length encoding. As noted hereinabove, the number of occurrences of given intensity can be predicted and pre-assigned. In that event, both the encoder and decoder would have sufficient information to send and receive data accurately. It may also be possible to determine the number of occurrences of data values for each frame, and to rank and encode only that frame based on the most efficient technique. In that case, it is necessary to intersperse the video data as so encoded with data indicating exactly what intensities are to correspond to given codes, perhaps by transmitting them in order.

The invention having been disclosed, a number of additional variations will now occur to persons skilled in the art. Reference should be made to the appended claims rather than the foregoing specification as indicating the true scope of the invention.

What is claimed is:

1. A narrow bandwidth signal transmission system, comprising:
    digitizing means providing quantized raw data samples of the signal to be transmitted;
    means for filtering and sampling the raw data samples, providing a statistically smoothed image subset having information representative of the full set of raw data, but fewer data points;
    a transform coder for determining the energy of the subset;
    means for encoding the transformed image of the subset;
    a predictor operable to predict likely raw data values at and between the filtered, sample values to produce a recovered set of data values, the predictor corresponding to a further predictor in a signal reception system;
    means for producing a difference signal by subtracting the raw data from the predicted valves;
    means for encoding the difference signal; and,
    means for transmitting the encoded transformed image and the encoded difference signal.

2. The transmission system of claim 1, comprising means for selecting at least one field of the difference signal for encoding and subsequent transmission.

3. The transmission system of claim 1, comprising means for normalizing and quantizing the transformed image prior to encoding.

4. The transmission system of claim 1, comprising means for filtering and quantizing the difference signal.

5. The transmission system of claim 2, comprising means for filtering and quantizing the difference signal prior to field selection.

6. A signal reception system for receiving and decoding a band width compressed signal having both an encoded transformed image of an energy field and an encoded difference signal, comprising:
    decoding means for detecting each of the encoded transformed image and the difference signal;
    means for reversely transforming the transformed image to recover at least one original energy field of sample values;
    a predictor operable to predict likely raw data values and synchronization information of and between the sampled values to produce a set of recovered data values, the predictor corresponding to a further predictor in a signal transmission system; and,
    an adder operable to sum the recovered data values and the difference signal, thereby reproducing raw data samples.

7. The reception system of claim 6, comprising means for selecting at least one field of the reversely transformed image for summing.

8. The reception system of claim 7, further comprising means for converting the recovered data values from a digital signal to an analog signal.

9. The reception system of claim 6, further comprising means for converting the recovered data values from a digital signal to an analog signal.

* * * * *